(12) United States Patent
Akaiwa et al.

(10) Patent No.: US 6,741,240 B1
(45) Date of Patent: May 25, 2004

(54) IMAGE DISPLAY APPARATUS

(75) Inventors: Shoichi Akaiwa, Matsumoto (JP);
Shuichi Fujiwara, Nagano-ken (JP);
Miki Nagano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/257,178

(22) Filed: Feb. 25, 1999

(30) Foreign Application Priority Data

Feb. 26, 1998 (JP) ............................................. 10-046046

(51) Int. Cl.$^7$ ............................. G09G 5/00; H04N 9/44; H03L 7/00
(52) U.S. Cl. ........................ 345/213; 345/204; 348/500; 348/540
(58) Field of Search ................................ 345/132, 131, 345/127, 3, 99, 530, 213, 204; 364/521; 348/552, 500, 536, 540, 537

(56) References Cited

U.S. PATENT DOCUMENTS

| | | | | |
|---|---|---|---|---|
| 4,990,904 A | * | 2/1991 | Zenda | 340/771 |
| 5,031,118 A | * | 7/1991 | Morizot | 364/521 |
| 5,633,655 A | * | 5/1997 | Hara | 345/132 |
| 5,703,661 A | * | 12/1997 | Wu | 345/212 |
| 5,745,391 A | * | 4/1998 | Topor | 364/707 |
| 5,801,767 A | * | 9/1998 | Wu | 345/11 |
| 5,929,924 A | * | 7/1999 | Chen | 348/552 |
| 6,011,592 A | * | 1/2000 | Vaughan et al. | 345/132 |
| 6,037,925 A | * | 3/2000 | Kim | 345/99 |
| 6,115,026 A | * | 9/2000 | Spurlock | 345/132 |

* cited by examiner

Primary Examiner—Steven Saras
Assistant Examiner—Alecia D. Nelson
(74) Attorney, Agent, or Firm—Oliff & Berridge, PLC

(57) ABSTRACT

The invention provides an image display apparatus that efficiently adjusts a video display even when a change takes place in an input signal. The image display apparatus includes a video input device that receives a video signal, a video display that displays an optical image based on an input signal S1 from the video input device, and a video signal adjusting device that adjusts the display setting of the video display based on a signal mode of the input signal S1. The image display apparatus further includes a determining device that causes the video display adjusting device to adjust the display setting of the video display. The determining device includes an apparatus startup detector unit that detects whether a startup of the image display apparatus creates a change in the input signal, and a signal change detector unit that detects the change in the input signal. The determining device determines whether to cause the video display adjusting device to adjust the display setting only when it is needed.

4 Claims, 3 Drawing Sheets

IMAGE DISPLAY APPARATUS

BACKGROUND OF THE INVENTION

1. Field of Invention

The present invention relates to an image display apparatus that includes an image input device that receives a video signal, a video display that displays an image based on an input signal from the video input device, and a video signal adjusting device that adjusts a display setting of the video display based on a signal mode of the input signal.

2. Description of Related Art

Conventionally available image display apparatuses each include a video input device that receives a video signal and a video display that displays an optical image based on a video signal from the video input device. When a computer or a video cassette recorder is connected to such an image display apparatus, the video signal from the computer is displayed on a large screen such as a projection screen. This structure constitutes a computer-based multi-media presentation system.

Since a variety of computers may be connected to the image display apparatus, the image display apparatus is adjusted beforehand to match input signal modes that correspond to the computer that is likely to be connected.

Even if resolution and refresh rate are identical, a horizontal frequency of a video signal may be different from computer to computer. Even if the horizontal frequencies are identical, computers may be still different in the front porch and back porch of the horizontal blanking period and the synchronization margin of the horizontal synchronization signal. When a new computer is connected to the image display apparatus, the image display apparatus is switched on. During an operation, a user must fine-adjust settings in tracking, synchronization, display position and the like in a predetermined signal mode on the video display, each time any change takes place in the input signal, which would possibly be caused by switching the computer, from one type to another.

A system has been contemplated which performs fine adjustment of the display setting of the video display when a change takes place in the signal input to the image display apparatus. In such a system, however, the fine adjustment takes time, particularly, a tracking adjustment is time-consuming. Thus, this system is not a practical choice.

SUMMARY OF THE INVENTION

It is therefore an object of the present invention to provide an image display apparatus, which includes a video input device that receives a video signal, a video display that displays an optical image based on an input signal from the video input device, and a video signal adjusting device that adjusts the display setting of the video display based on a signal mode of the input signal, and which efficiently adjusts the video display even when a change takes place in the input signal.

To achieve the above object, the image display apparatus of the present invention only performs an automatic adjustment of the video display in a predetermined situation. Specifically, the image display apparatus of the present invention includes a video input device that receives a video signal, a video display that displays an optical image based on an input signal from the video input device, and a video signal adjusting device that adjusts the display setting of the video display based on a signal mode of the input signal. The image display apparatus also includes a determining device that causes the video display adjusting device to adjust the display setting of the video display when the input signal changes. The determining device includes an apparatus startup detector unit that detects whether a startup of the image display apparatus creates a change in the input signal. The determining device also includes a signal change detector unit that detects the change in the input signal. The determining device determines whether to cause the video display adjusting device to adjust the display setting, by referring to the combination of states detected by the apparatus startup detector unit and the signal change detector unit.

Since the image display apparatus of the present invention is provided with the determining device that determines whether to cause the video display adjusting device to adjust the display setting in response to a change in the input signal, the video display adjusting device performs an automatic adjustment only when it is needed. The display adjustment of the video display is thus efficiently performed. With its apparatus startup detector unit, the determining device determines whether any change takes place in the input signal in response to a startup of the image display apparatus. The determining device causes the video display adjusting device to automatically adjust the display setting in response to the change in the input signal at the startup.

The image display apparatus is also provided with a signal mode memory that stores the signal mode that the video display used at a power shutdown. When the apparatus startup detector unit determines that a change in the input signal has occurred at the startup, the determining device retrieves the signal mode stored in the signal mode memory to cause the video display adjusting device to adjust the display setting.

The signal mode memory is preferably a non-volatile memory that retains its data when power is removed, for example, EPROM (Erasable Programmable Read Only Memory) or EEPROM (Electrically Erasable Programmable Read Only Memory).

Since the video display adjusting device performs an automatic adjustment by retrieving the signal mode that was used at the last power shutdown, the display setting of the video display at the power shutdown is reused. The video display setting can thereby efficiently adjust the display setting.

When the signal change detector unit detects no signal change, the determining device causes the video display adjusting device to not adjust the display setting.

Since the determining device has an option to cause the video display adjusting device to not perform an automatic adjustment, the determining device performs the automatic adjustment only when it is needed.

The determining device includes a pre-change signal detector unit that detects the presence or absence of the input signal prior to the signal change when the signal change detector unit detects the signal change. The determining device preferably determines whether to cause the video display adjusting device to perform the adjustment, by referring to the state detected by the pre-change signal detector unit.

The absence of the input signal prior to the change may be detected when the computer that outputs the video signal is switched on subsequent to the startup of the image display apparatus, or when the computer is connected to the video input unit of the image display apparatus subsequent to the startup of the image display apparatus. The presence of the input signal prior to the change may be detected when a plurality of computers, that are connected to the image display apparatus, are selectively switched from one to another, or when the setting of the video signal is modified in the computer currently outputting the video signal.

Since the determining device is provided with the pre-change signal detector unit, the determination of whether to cause the video display adjusting device to adjust the display setting is as follows.

① When the presence of a pre-change signal is detected, it is considered likely that the computer was selectively switched, or that the setting of the video signal was modified. The video display adjusting device performs the automatic adjustment, because the signal mode of the input signal changed, or because the change of the computer type changed the display setting data.

② When the absence of a pre-change signal is detected, it is considered likely that the computer that outputs the video signal was switched off and then on again, after the startup of the image display apparatus, or that the computer was reconnected to the video input unit. The computer could possibly be the one with which the display setting was once established. The determining device examines the signal modes of the computers that had previously been connected thereto, and adopts the display setting data if it agrees with the signal mode of the currently connected computer, rather than causing the video display adjusting device to immediately perform the automatic adjustment.

Since the video display adjusting device performs the automatic adjustment in a limited way, the display setting of the video display is efficiently adjusted.

The image display apparatus further includes a display setting memory that stores the display setting data of the video display in accordance with the type of a signal mode of a likely video signal, and the type of tracking information, wherein the display setting data of the video display includes tracking information for the horizontal synchronization adjustment of the video display. The determining device includes a tracking information comparator unit that retrieves the tracking information of the input signal subsequent to the signal change, and compares the tracking information with the tracking information of the display setting stored in the display setting memory, when the pre-change signal detector unit detects no input signal prior to the signal change. The determining device determines whether to cause the image display adjusting device to adjust the display setting, by referring to the comparison result provided by the tracking information comparator unit.

With its tracking information comparator unit, the image display apparatus compares the tracking information before the change to the tracking information after the change, and only causes the video display adjusting device to adjust the display setting when there is no match between them. The video display adjusting device thereby performs the adjustment more efficiently.

DETAILED DESCRIPTION OF PREFERRED EMBODIMENTS

Figure 1:
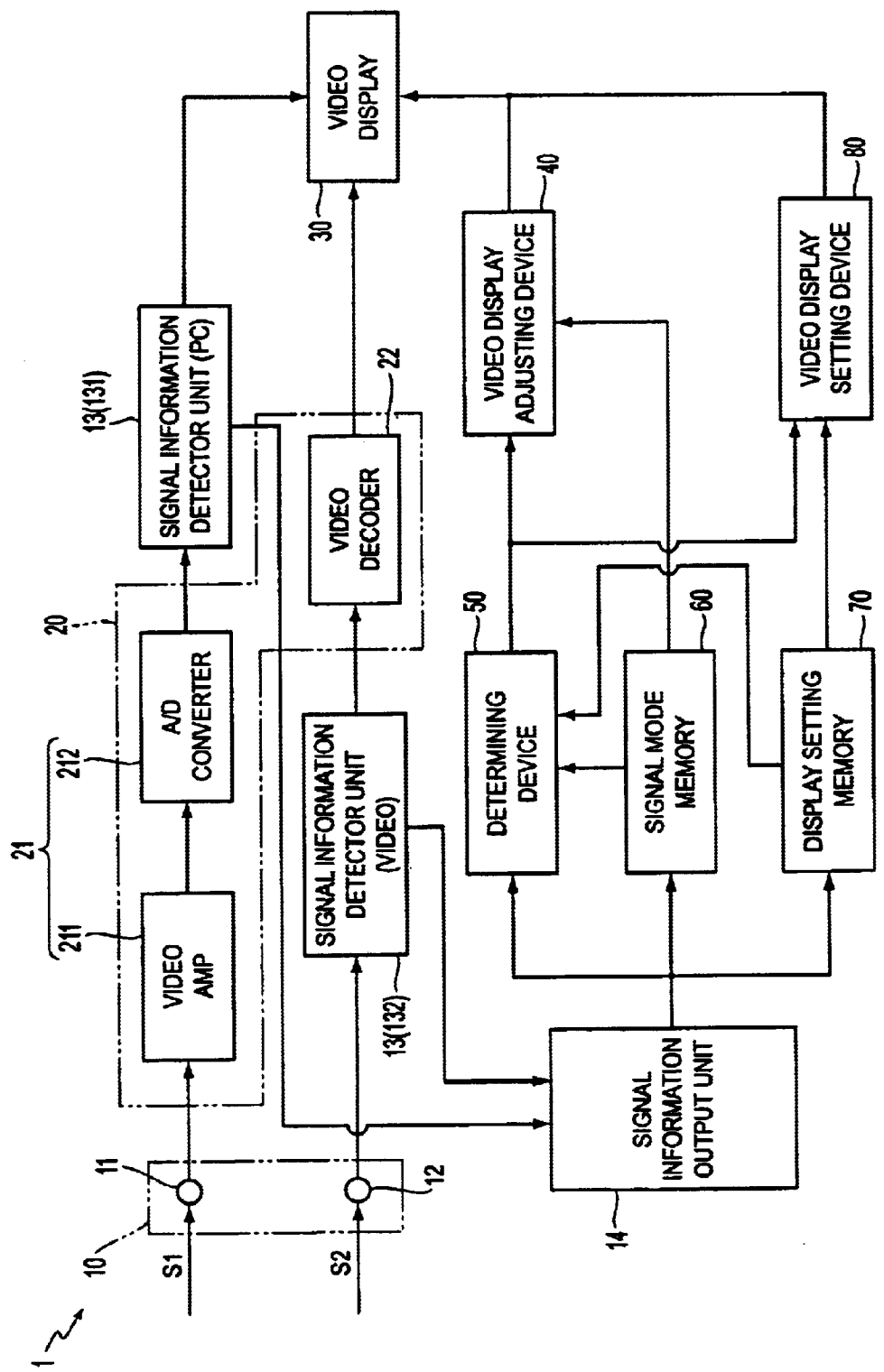
FIG. 1 is a block diagram showing the structure of an image display apparatus according to one embodiment of the present invention.

Referring to the drawings, one embodiment of the present invention is discussed below.

FIG. 1 is a block diagram of a projector-type image display apparatus 1 in accordance with one embodiment of the present invention.

The image display apparatus 1 includes a video input device 10 that is connected to a computer or a VCR (not shown), a signal processing device 20 that processes an input signal S1 input to the video input device 10, a video display 30 that forms an optical image from a video signal processed by the signal processing device 20, a video display adjusting device 40 that adjusts the display setting of the video display 30, and a determining device 50 that determines whether to cause the video display adjusting device 40 to perform an automatic video adjustment, when the input signal S1 input to the video input device 10 changes. The image display apparatus 1 also includes a signal mode memory 60 that stores the signal mode of the input signal S1 supplied in from the computer, a display setting memory 70 that stores the display setting data of tracking, synchronization and display position of the video display 30, which had been previously set by the user, and a video display setting device 80 that retrieves the display setting data from the display setting memory 70 to set it onto the video display 30.

The video input device 10 is provided with an RGB input terminal 11 that receives the input signal S1, which includes RGB signals output by the computer, and a video input terminal 12 that receives an input signal S2, which is a composite signal output by the VCR. A signal information detector unit 13 is arranged for input signals S1 and S2 between the video input device 10 and the video display device 30. A signal information output unit 14 is connected to the signal information detector unit 13 to output signal information to devices.

The signal information detector unit 13 includes a PC signal information detector unit 131 connected to the input system for the RGB signal S1, and a video signal information detector unit 132 connected to the input system for the composite signal S2. Specifically, the PC signal information detector unit 131 detects signal information of the input signal S1 that is input through the RGB input terminal 11, and the signal information of the RGB input signal S1 includes refresh rate and tracking information, as well as resolution information such as VGA and SVGA. The video signal information detector unit 132 detects the signal information of the input signal S2 that is input through the video input terminal 12, and the signal information of the composite input signal S2 includes television standard information, such as NTSC and PAL. The PC signal information detector unit 131 and video signal information detector unit 132 each employ known circuits for detecting these pieces of signal information.

The signal information output unit 14 outputs the signal information detected by the signal information detector unit 13 to a variety of devices, including the determining device 50, signal mode memory 60, and display setting memory 70. The signal information output unit 14 also outputs the signal information to the video display 30 to indicate, to the video display 30, the content of the input signals S1 and S2, though the connection for the two units is not shown in FIG. 1.

The signal processing device 20 includes an RGB signal processing system 21 and a video decoder 22. The RGB signal processing system 21 includes a video amplifier 211 that amplifies the RGB signal S1, and an A/D converter 212 that analog-to-digital converts the amplified RGB signal S1. The RGB signal processing system 21 is disposed between the RGB input terminal 11 and the PC signal information detector unit 131. The video decoder 22 decodes the input signal S2 as a composite signal, which is input through the video input terminal 12, to convert it into a digital RGB signal, and is disposed between the video signal information detector unit 132 and the video display 30.

Figure 2:
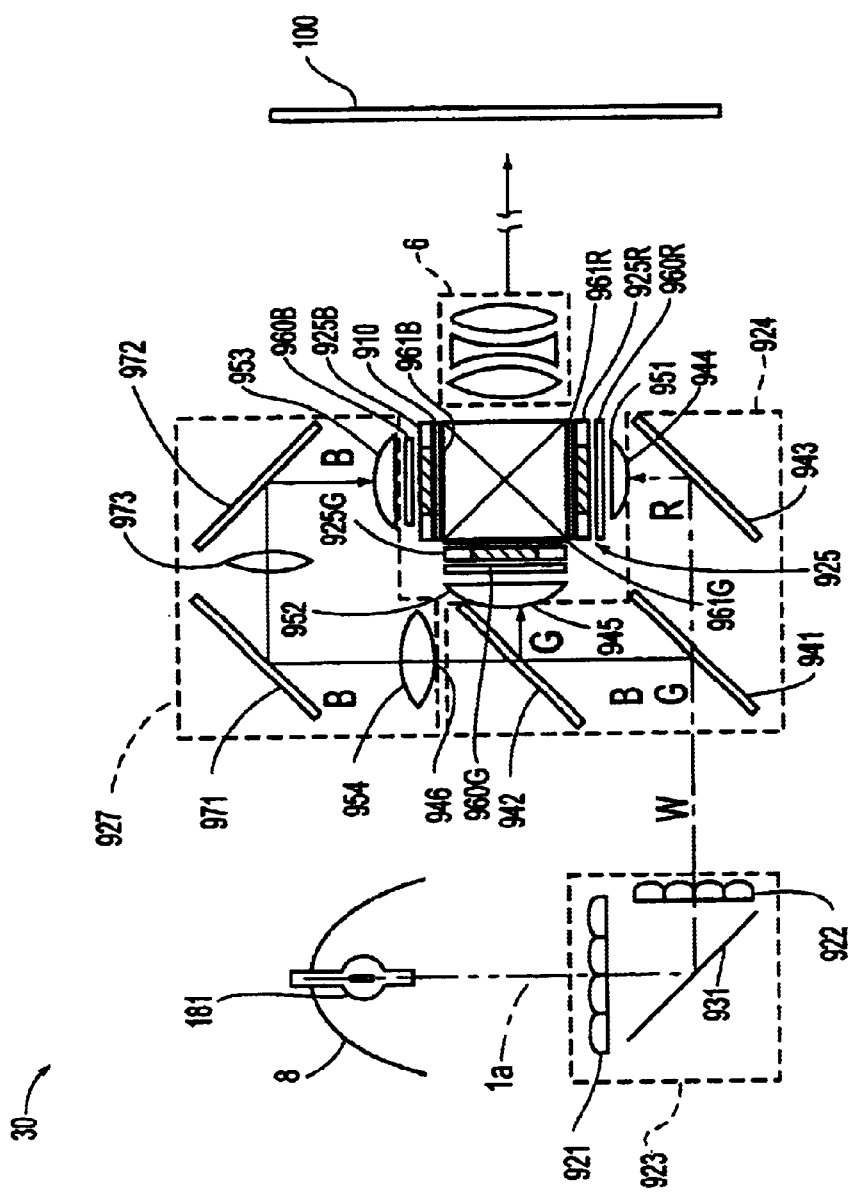
FIG. 2 schematically shows the structure of a video display in accordance with the embodiment of the present invention.

The video display 30 includes an optical modulator system 925 (which is described below) that optically modulates a light beam emitted by a light source lamp in accordance with the video signal. The video display 30 is of a projector-type that enlarges and projects the light beam modulated by the optical modulator system 925. Referring to FIG. 2, the video display 30 includes a light-source lamp unit 8, a lighting system 923 that makes the on-screen illuminance distribution of the light beam (W) from the light-source lamp unit 8 uniform, a color separating optical system 924 that separates the light beam (W) from the lighting system 923 into red (R), green (G) and blue (B) light beams, the optical modulator system 925 that modulates the color-light beams in accordance with the video signal, and a prism unit 910 as a color synthesis system that synthesizes the modulated color-light beams.

The lighting system 923 includes a reflecting mirror 931 that bends the light axis 1a of the light beam W emitted by the light-source lamp unit 8 toward the front portion of the apparatus, a first lens plate 921 and a second lens plate 922, both of which are disposed such that the reflecting mirror 931 subtends a right angle which is defined by the two plates make.

The first lens plate 921 includes a plurality of rectangular lenses arranged in a matrix, and divides the light beam from the light source into a plurality of segment beams, which are focused in the vicinity of the second lens plate 922.

The second lens plate 922 includes a plurality of rectangular lenses arranged in a matrix, and has the function of transmitting segment beams from the first lens plate 921 onto light valves 925R, 925G, and 925B (which are described below) that constitute the optical modulator system 925.

With its lighting system 923, the image display apparatus 1 illuminates the liquid-crystal light valves 925R, 925G, and 925B with generally uniform illuminance light, and provides a projected image free from illuminance distribution irregularity.

The color separating optical system 924 includes a blue/green-reflecting dichroic mirror 941, a green-reflecting dichroic mirror 942, and a reflecting mirror 943. The blue light beam B and the green light beam G contained in the light beam W emitted by the lighting system 923 are first reflected at a right angle off the blue/green-reflecting dichroic mirror 941 toward the green-reflecting mirror 942.

The red light beam R passes through the blue/green-reflecting dichroic mirror 941, is reflected at a right angle off the reflecting mirror 943 downstream thereof, and reaches the prism unit 910 via the exit section 944 for the red light beam. It is only the green light beam G, of the blue and green light beams B and G that are reflected off the mirror 941, is reflected at a right angle off the green-reflecting mirror 942, and is delivered out toward the color synthesis system via the exit section 945 for the green light beam. The blue light beam B, which passes through the mirror 942, is delivered toward a light guide system 927 via the exit section 946 for the blue light beam. In this embodiment, the distances from the exit section of the light beam W of the lighting system respectively to the exit sections 944, 945, and 946 in the color separating optical system 924 are set to be equal.

Converging lenses 951 and 952 are respectively disposed at the exit sides of the exit sections 944 and 945 for the red R and green G colors in the color separating optical system 924. These color light beams from the respective exit sections 944 and 945 are therefore made parallel through the converging lenses 951 and 952.

The red and green light beams R, G, that are made parallel in this way, are respectively introduced through entrance polarizers 960R and 960G into the liquid-crystal light valves 925R and 925G to be modulated there. The blue light beam B, on the other hand, is guided to the liquid-crystal light valve 925B via the light guide system 927 for modulation.

The liquid-crystal light valves 925R, 925G and 925B are each a liquid-crystal panel that employs polysilicon thin-film transistors as a switching element, and are provided with a data-side driver and a scanning-side driver (not shown in FIG. 2) to drive the pixels in the liquid-crystal light valves 925R, 925G and 925B.

The light guide system 927 includes a converging lens 954 disposed on the exit side of the exit section 946 for the blue light beam B, an input reflecting mirror 971, an output reflecting mirror 972, an intermediate lens 973 disposed between these mirrors, and a converging lens 953 disposed in front of the liquid-crystal panel 925B. The blue light beam B from the converging lens 953 is introduced into the liquid-crystal light valve 925B via an input polarizer 960B for modulation. Among the lengths of the optical paths of the color light beams from the light-source lamp 181 to the respective liquid-crystal panels, the length of the optical path of the blue light beam B is the longest, and thus the blue light beam suffers a maximum loss. By providing the light guide system 927, however, the light loss the blue light beam suffers is restricted.

The color light beams R, G and B modulated through the respective liquid-crystal light valves 925R, 925G, and 925B are introduced via exit polarizers 961R, 961G and 961B into the prism unit 910 to be synthesized there. A color image synthesized by the prism unit 910 is enlarged and projected through a projection lens unit 6 to a screen 100 at a predetermined position.

As shown in FIG. 1, the video display adjusting device 40 adjusts the display setting of the video display 30 based on the input signals S1 and S2, specifically in terms of tracking, synchronization and display position. The video display adjusting device 40 automatically adjusts the video display 30 in accordance with the determination results provided by the determining device 50, while the user has the option to manually adjust the video display 30 using the switches on the image display apparatus 1.

The determining device 50 includes RAM that stores the signal information output by the signal information output unit 14, and CPU that determines whether to cause the video display adjusting device 40 to perform the adjustment based on the signal information written into the RAM, though both memories are not shown in FIG. 1.

The signal mode memory 60 includes EEPROM that retains its data when power is removed from the image display apparatus 1. When the image display apparatus 1 is switched off, the signal mode memory 60 stores the signal mode (resolution and refresh rate), which was used by the video display 30 immediately prior to a power shutdown.

The display setting memory 70 includes SRAM (Static RAM) that stores sequentially the display setting data of the video display 30 in compliance with the input signal S1 during the startup of the image display apparatus 1, and EEPROM that stores the display setting data in the video display 30 that the user adjusted in compliance with the type of computer, input signal S1 and signal mode to present an appropriate image on the screen. EEPROM in the display setting memory 70 is also shared by the signal mode memory 60, and retains its data when power is removed from the image display apparatus 1.

The video display setting device 80 retrieves the information concerning the display setting data from the display setting memory 70, and sets the video display according to the retrieved display setting data. The display setting memory 70 stores the display setting data concerning the tracking, synchronization and display position, set by the user in accordance with the signal mode, such as the resolution and refresh rate. If the signal mode only, as trigger information, is available when the video display setting device 80 attempts to retrieve the display setting data, the video display setting device 80 sets the video display 30 based on standard setting data in accordance with the signal mode.

Figure 3:
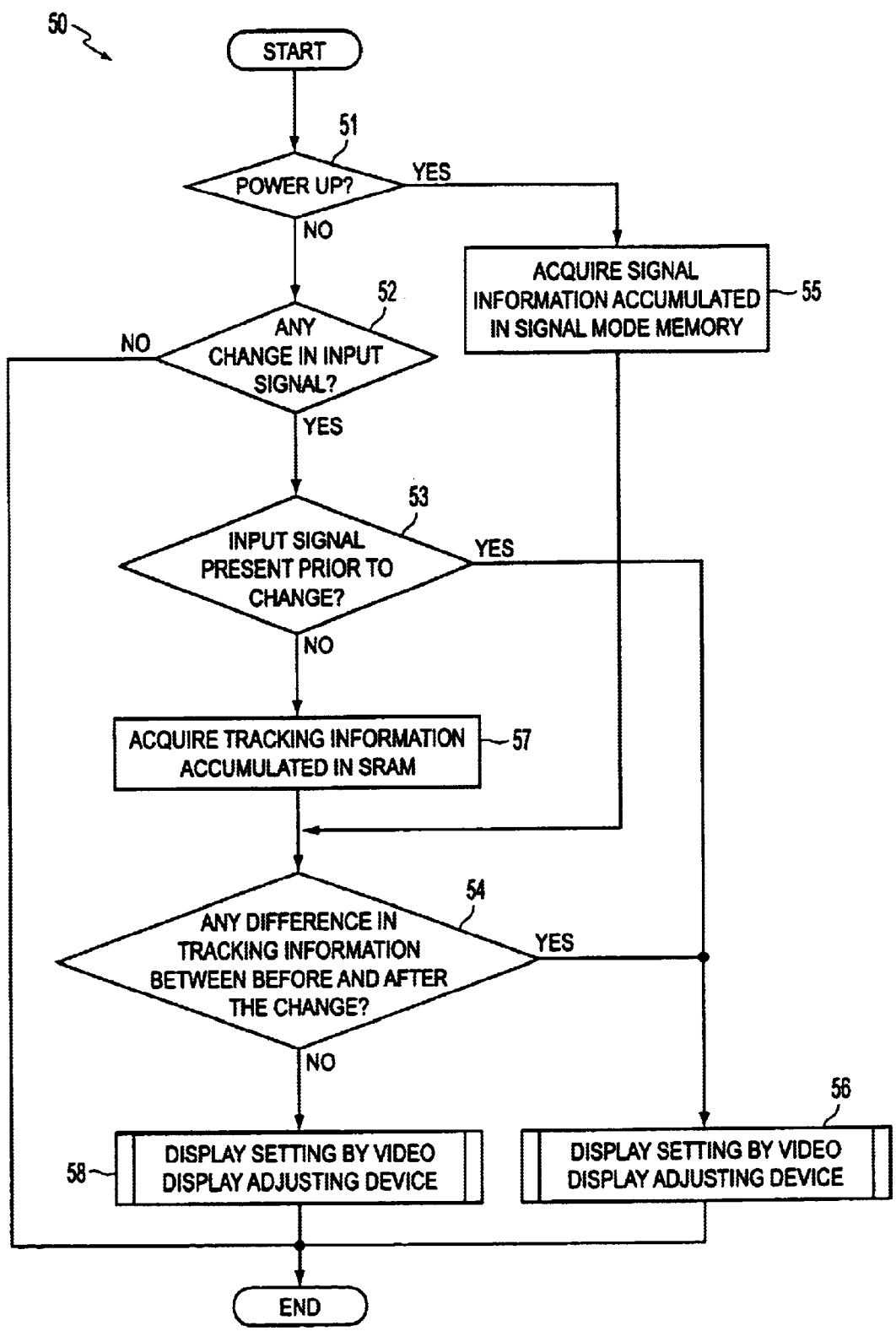
FIG. 3 is a flow chart showing determination steps of a determining device in accordance with the embodiment of the present invention.

Referring to a flow diagram shown in FIG. 3, the software function of the determining device 50 is discussed below.

The determining device 50 includes an apparatus startup detector unit 51 that detects whether the change in the input signal S1 is caused by a startup of the image display apparatus 1, a signal change detector unit 52 that detects the change in the input signal S1, a pre-change signal detector unit 53 that detects the presence or absence of the input signal S1 prior to the change when the signal change detector unit 52 detects the change in the input signal S1, and a tracking information comparator unit 54 that retrieves the tracking information of the input signal S1 subsequent to the signal change, and compares the tracking information with the tracking information of the display setting stored in the display setting memory 70, when the pre-change signal detector unit 53 detects no input signal prior to the signal change. The determining device 50 performs the determination in response to the change in the input signal S1. The operation of the determining device 50 is described below via numbered steps.

(1) In the image display apparatus 1, the apparatus startup detector unit 51 detects whether any change in the input signal S1 was caused by the startup of the image display apparatus 1.

(2) If the apparatus startup detector unit 51 detects any change in the input signal S1 at the startup of the image display apparatus 1, the determining device 50 performs step 55 to acquire the signal information (the signal mode and standard display setting data in the signal mode) stored in the signal mode memory 60. The tracking information comparator unit 54 compares the tacking information constituting the signal information before, and the tracking information after, the change in the input signal S1. Since power was down prior to the change, there is a difference between the tracking information before and the tracking information after the change, and the determining device 50 executes step 56 to cause the video display adjusting device 40 to perform the automatic adjustment.

(3) If the apparatus startup detector unit 51 detects no change in the input signal S1 at the startup of the image display apparatus 1, the signal change detector unit 52 attempts to detect any change in the input signal S1. If no change is detected, the determining device 50 ends the determination, because the display setting of the video display 30 is not required.

(4) If any change is detected in the input signal S1, the pre-change signal detector unit 53 attempts to detect the presence or absence of the input signal S1 prior to the change. If the presence of the input signal S1 prior to the change is detected, it is considered likely that a switch of computers, from one to another, changed the input signal S1. The determining device 50 performs step 56 to cause the video display adjusting device 40 to perform the automatic adjustment.

(5) If the presence of the input signal S1 prior to the change is not detected, it is considered likely that a computer that had output the input signal S1 prior to the change was switched off and then on again, or that a computer that had output the input signal S1 prior to the change was reconnected. The determining device 50 performs step 57 to retrieve the signal mode and the tracking information prior to the change stored in SRAM in the display setting memory 70, and stores them in its RAM. The tracking information comparator unit 54 compares the tracking information of the input signal S1 subsequent to the change to the tracking information stored in RAM in the determining device.

(6) When the tracking information comparator unit 54 determines that the tracking information before the change and the tracking information after the change are different, the determining device 50 performs step 56 to cause the video display adjusting device 40 to perform the automatic adjustment. On the other hand, when the tracking information comparator unit 54 determines that the tracking information before the change and the tracking information after the change are the same, the display setting data in the video display 30 is reused without any modification, and the determining device 50 performs step 58 to cause the video display setting device 80 to set the video display.

The embodiment of the present invention presents the following advantages.

With its determining device 50, the image display apparatus 1 causes the video display adjusting device 40 to only automatically adjust the video display 30 in a particular case even when there is a change in the input signal S1. This results in improved efficiency in the adjustment of the display setting of the video display.

With its apparatus startup detector unit 51, the image display apparatus 1 determines whether a change took place in the input signal S1 in response to the startup of the image display apparatus 1. If a change took place in the input signal S1 at the startup, the determining device 50 causes the video display adjusting device 40 to perform the automatic adjustment.

Since the image display apparatus 1 is provided with the signal mode memory 60 that stores the signal mode of the video display 30 at the last power shutdown, the video display adjusting device 40 retrieves the signal mode stored in the signal mode memory 60 to perform the automatic adjustment. The display setting of the video display at the last power shutdown is thus reused, resulting in improved efficiency in the display setting by the video display adjusting device 40.

When the signal change detector unit 52 of the determining device 50 detects no change in the input signal S1, the determination ends as described in the step (3). The video display adjusting device 40 thus performs the automatic adjustment only in time of need.

When the pre-change signal detector unit 53 of the determining device 50 detects the presence of the input signal S1 prior to the change, as already described in steps (4) and (5), the video display adjusting device 40 performs the automatic adjustment. This arrangement permits the automatic adjustment under a limited condition, and the adjustment of the display setting of the video display 30 is thus performed even more efficiently.

The tracking information comparator unit 54 of the determining device 50 causes the video display adjusting device 40 to perform the automatic adjustment only when the tracking information subsequent to the change fails to agree with the tracking information prior to the change stored in SRAM in the display setting memory 70. The video display adjusting device 40 performs the adjustment in an efficient manner.

The present invention is not limited to the above embodiment. At least the following modifications fall within the scope of the present invention.

The above embodiment of the present invention has been discussed in connection with the projector-type image display apparatus 1. The present invention is not limited to this. Alternatively, the present invention may be applied to any display as long as it is a dot-matrix display, such as a plasma display and an electroluminescence display.

In the determining device 50, the signal change detector unit 52 is disposed after the apparatus startup detector unit 51 in the above embodiment. Alternatively, the signal change detector unit 52 may be disposed before the apparatus startup detector unit 51 in the determining device 50 in the flow diagram shown in FIG. 3.

The signal mode memory 60 includes EEPROM in the above embodiment. Alternatively, the signal mode memory 60 may include EPROM or RAM that is provided with a power supply, even if the power source of the image display device is cut off.

While the form of apparatus described above constitutes a preferred embodiment, it is to be understood that the present invention is not limited to this form of apparatus, and that other forms of apparatus may be employed without departing from the scope of the present invention.

With its determining device, the image display apparatus causes the video display adjusting device to perform the automatic adjustment only in time of need, thereby resulting in improved efficiency in the display setting of the video display device.

What is claimed is:

1. An image display apparatus that includes a video display that displays an optical image based on an input signal, and a video signal adjusting device that adjusts a display setting of said video display based on a signal mode of said input signal, said image display apparatus comprising:

a determining device that causes said video display adjusting device to adjust the display setting of said video display when said input signal changes, said display setting of said video display including tracking information for the horizontal synchronization adjustment of said video display, said determining device including:

a signal change detector unit that detects a change in said input signal;

a signal mode memory device that stores a signal mode information used by said video display prior to the change in said input signal, said signal mode information including said tracking information;

a comparator unit that retrieves said tracking information of said input signal subsequent to the change in said input signal, and compares said tracking information with tracking information of the display setting data stored in said signal mode memory device; and a pre-change signal detector unit that determines a presence or absence of an input signal is present or absent prior to the signal change in said input signal, wherein said determining device determines whether to cause said video display adjusting device to adjust the display setting, based on the comparison result provided by said comparator unit and the determination result provided by the pre-change signal detector unit.

2. The image display apparatus according to claim 1, said determining device causing said video display adjusting device to not adjust the display setting when said signal change detector unit detects no signal change.

3. A method of displaying an image with an image display apparatus that includes a video display that displays an optical image based on an input signal, and a video signal adjusting device that adjusts a display setting of said video display based on a signal mode of said input signal, the method comprising the steps of:

causing, with a determining device, said video display adjusting device to adjust the display setting of said video display when said input signal changes;

detecting, with a signal change detector unit, a change in said input signal;

storing, with a signal mode memory device, a signal mode information used by said video display prior to the change in said input signal, said signal mode information including a tracking information, said display setting of said video display including tracking information for the horizontal synchronization adjustment of said video display; and comparing, with comparator unit that retrieves said tracking information of said input signal subsequent to the change in said input signal, said tracking information with tracking information of the display setting data stored in said signal mode memory device; and determining, with a pre-change signal detector unit of the determining device, a presence or absence of an input signal prior to the change in said input signal, wherein said determining device determines whether to cause said video display adjusting device to adjust the display setting, based on the comparison result provided by said tracking information comparator unit and the determination result provided by the pre-change signal detector unit.

4. The method according to claim 3, said determining device causing said video display adjusting device to not adjust the display setting when said signal change detector unit detects no signal change.

* * * * *